United States Patent
N et al.

(10) Patent No.: US 12,501,310 B2
(45) Date of Patent: Dec. 16, 2025

(54) PRIORITIZING DATA PACKETS IN WIRELESS COMMUNICATION NETWORK

(71) Applicant: Samsung Electronics Co., Ltd., Suwon-si (KR)

(72) Inventors: Shanthossh N, Bangalore (IN); Rishav Agarwal, Bangalore (IN); Eda Raja Moses Manoj Kumar, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 340 days.

(21) Appl. No.: 18/456,214

(22) Filed: Aug. 25, 2023

(65) Prior Publication Data

US 2024/0049043 A1 Feb. 8, 2024

Related U.S. Application Data

(63) Continuation of application No. PCT/KR2023/011304, filed on Aug. 2, 2023.

(30) Foreign Application Priority Data

Aug. 8, 2022 (IN) .............................. 202241045275
Jul. 14, 2023 (IN) .............................. 202241045275

(51) Int. Cl.
*H04W 28/02* (2009.01)
*H04L 47/62* (2022.01)

(52) U.S. Cl.
CPC ..... *H04W 28/0268* (2013.01); *H04L 47/6215* (2013.01)

(58) Field of Classification Search
CPC ...................... H04L 47/6215; H04W 28/0268
(Continued)

(56) References Cited

U.S. PATENT DOCUMENTS

| 9,060,295 B2 | 6/2015 | Edara et al. |
| 10,405,327 B2 | 9/2019 | Loehr et al. |

(Continued)

FOREIGN PATENT DOCUMENTS

| KR | 10-2022-0051208 A | 4/2022 |
| WO | 2018226024 A1 | 12/2018 |

(Continued)

OTHER PUBLICATIONS

International Search Report dated Nov. 23, 2023 for PCT/KR2023/011304.
PCT Written Opinion dated Nov. 23, 2023 for PCT/KR2023/011304.

*Primary Examiner* — Wing F Chan
*Assistant Examiner* — Leon Y Tseng
(74) *Attorney, Agent, or Firm* — Nixon & Vanderhye P.C.

(57) ABSTRACT

A method for prioritizing data packets in a wireless network. Data packets are received at a SDAP buffer. Flow queues may be created by dividing PDCP buffer into high priority flow queue and low priority flow queue to determine priority for each data packets based on QoS parameters. Based on QoS parameters performing one of transmitting the at least one data packet from the at least one high priority flow queue and delaying transmission of at least one data packet of the at least one low priority flow queue by buffering the at least one data packet, the electronic device may be configured with connectivity or transmitting data packets from high priority flow queue to first stack and data packet from the low priority flow queue to second stack, when the electronic device may be configured with multi RAT multi connectivity.

20 Claims, 11 Drawing Sheets

(58) Field of Classification Search
USPC .......................................................... 709/238
See application file for complete search history.

(56) References Cited

U.S. PATENT DOCUMENTS

| | | | |
|---|---|---|---|
| 11,218,902 | B2 | 1/2022 | Lee et al. |
| 11,228,937 | B2 | 1/2022 | Phan et al. |
| 11,252,613 | B2 | 2/2022 | Condoluci et al. |
| 11,638,173 | B2 | 4/2023 | Ozturk et al. |
| 11,916,790 | B2 | 2/2024 | Urman et al. |
| 12,010,173 | B2 | 6/2024 | Shilimkar et al. |
| 2005/0238051 | A1* | 10/2005 | Yi .......................... H04W 28/10 370/328 |
| 2017/0055313 | A1* | 2/2017 | Sharma ............. H04W 36/0066 |
| 2019/0349810 | A1* | 11/2019 | Cho ....................... H04W 28/06 |
| 2020/0100156 | A1* | 3/2020 | Liu .................... H04W 28/0268 |
| 2021/0306902 | A1* | 9/2021 | Williams ................. H04L 69/08 |
| 2022/0338205 | A1 | 10/2022 | Lee et al. |
| 2022/0408305 | A1 | 12/2022 | Jin et al. |
| 2024/0323130 | A1* | 9/2024 | Yu ........................... H04L 47/28 |

FOREIGN PATENT DOCUMENTS

| | | |
|---|---|---|
| WO | WO2021160123 A1 | 8/2021 |
| WO | WO2022143399 A1 | 7/2022 |

* cited by examiner

UL SDAP Data PDU format with SDAP header

PRIORITIZING DATA PACKETS IN WIRELESS COMMUNICATION NETWORK

CROSS-REFERENCE TO RELATED APPLICATIONS

This application is a continuation application of international application No. PCT/KR2023/011304, filed on Aug. 2, 2023, which is based on and claims the benefit of Indian Provisional Application 202241045275 filed on Aug. 8, 2022, and Indian Complete Application 202241045275 filed on Jul. 14, 2023, the disclosures of each of which are hereby entirely incorporated by reference herein.

BACKGROUND

Field

Certain example embodiments relate to wireless networks, for example, to prioritizing data packets in the wireless networks using Quality of Service based Bearer Optimizer (QBO) (QBO) in $5^{th}$ generation networks and above.

Description of Related Art

In general, an Access Stratum (AS) in communication networking is a functional layer in an Universal Mobile Telecommunications System (UMTS) and a Long Term Evolution (LTE) wireless telecom protocol. The AS stacks between a radio network and an electronic device. A Service Data Adaption Protocol (SDAP), Packet Data Convergence Protocol (PDCP)-Radio Link Control (RLC) in AS, performs in such a way that data coming from upper layers gets implicitly forwarded by the SDAP to the PDCP and from the PDCP to the RLC. The forwarded data packets receive a similar treatment from multiple applications, even though the priority and latency requirements for different data packets are different. The different data packets can be from different application and the different applications can be a voice messaging application, video call application, image editor and the like.

The number of applications with $5^{th}$ generation is on a surge and with so much Uplink (UL) data being generated, there is a need to provide a classification mechanism at a communication protocol-Access Stratum (CP-AS) for better services to critical applications. The critical applications can be the applications that need preference or fast processing. The SDAP—Quality of Service (QoS) model has been introduced in the 5G and beyond 5G technologies, that helps filtering of data packets at the SDAP to the Data Radio bearers (DRB) configured. Most applications with different QoS get mapped to the same DRB, but the CP-AS treats the data packets equally with respect to priority even though the high QoS packets demand special priority. The SDAP fails to differentiate between the different data packets that map to same DRB. There are no existing method(s) available to help prioritize different QoS data packets at the CP-AS and affecting user quality.

SUMMARY

Certain example embodiments provide a method for prioritizing data packets in a wireless network using QBO in a single connectivity network.

Certain example embodiments provide a method for prioritizing data packets in the wireless network using the QBO in a multi-Radio Access Technology (RAT) multi connectivity network.

Certain example embodiments provide a method for prioritizing data packets using QBO. The data packets may be received at a SDAP buffer. Flow queues may be created at least by dividing a PDCP buffer into a high priority flow queue and a low priority flow queue to determine a priority for each data packets based on QoS parameters. Based on the QoS parameters, performing one of transmitting the data packets from the at least one high priority flow queue and delaying transmission of the data packets of the low priority flow queue by buffering the data packets, when the electronic device is configured with single connectivity or transmitting the data packets from the high priority flow queue to a first stack and the data packet from the low priority flow queue to a second stack, when the electronic device is configured with multi RAT multi connectivity.

In an example embodiment, mapping the data packets from the SDAP buffer to the low priority flow queue or the high priority flow queue at the PDCP buffer based on the QoS parameters may comprise determining a number of Service data unit (SDUs) to be collected for the data packets in each flow queue based on packet parameters and collecting the number of SDUs of the plurality of data packets from each flow queue based on the priority and transmitting to lower layers of the first stack for single mode connectivity and/or the second stack when a dual connectivity is configured.

In an example embodiment, the packet parameters may be at least one of: a number of SDUs and/or a number of bytes to be collected based on a depletion of lower QoS, a priority of the plurality of data packets at upper layers, an arrival pattern of the data packets to the first stack and/or the second stack, a channel condition, and an extraction rate of the number of byte.

In an example embodiment, mapping the data packets from the SDAP to the high priority flow queue and the low priority flow queue to the first stack, and/or to the high priority flow queue to the first stack and the at least one low priority flow queue to the second stack, may be based on at least one of Layer1/Layer2 Key Performance Indicators (KPIs) based on parameters like Reference signal Receive power (RSRP), Reference signal receive quality (RSRQ), Signal to noise ratio (SNR), Uplink pathloss, Block error rate (BLER), Channel quality indicator (CQI) but not only limited to the above. "Based on" as used herein covers based at least on.

In an example embodiment, mapping the data packets from the SDAP to the high priority flow queue and the low priority flow queue to the first stack, and/or to the at least one of high priority flow queue to the first stack and the priority flow queue to the second stack, may be based on the above KPIs.

Certain example embodiments provide an electronic device for prioritizing data packets using QBO. The electronic device may include a memory, a processor comprising processing circuitry, a QoS packet controller comprising processing circuitry, and a communicator comprising communication circuitry. The communicator may be communicatively coupled, directly or indirectly, to the memory, the processor, and QoS packet controller may be configured to receive data packets at the SDAP buffer. Flow queues may be created at least by dividing a PDCP buffer into a high priority flow queue a low priority flow queue and determine a priority for each data packets received based on QoS parameters. Based on the QoS parameters, the data packets may be transmitted from the high priority flow queue and delaying transmission of data packet of the low priority flow queue by buffering the data packet, when the electronic device is configured with single connectivity or transmit the data packet from the high priority flow queue to a first stack and the data packet from the low priority flow queue to a second stack, when the electronic device is configured with multi-RAT multi connectivity.

According to embodiments, a method performed by an electronic device for prioritizing data packets in a wireless communication network, the method comprises receiving a plurality of data packets at a Service Data Adaptation Protocol (SDAP) buffer, the plurality of data packets transmitted to a PDCP buffer. The method comprises creating a plurality of flow queues by dividing the PDCP buffer into at least one high priority flow queue and at least one low priority flow queue. The method comprises determining a priority for each of the plurality of data packets received based on QoS parameters. The method comprises mapping at least one data packet of the plurality of data packets from the SDAP buffer to one of the at least one high priority flow queue or the at least one low priority flow queue at the PDCP buffer based on the QoS parameters. The method comprises transmitting the at least one data packet of the at least one high priority flow queue and delaying transmission of at least another data packet of the at least one low priority flow queue by buffering the at least another data packet.

According to embodiments, an electronic device for prioritizing data packets in a wireless communication network, the electronic device comprises a memory. The electronic device comprises at least one processor. The electronic device comprises at least one transceiver. The at least one processor is configured to receive a plurality of data packets at a Service Data Adaptation Protocol (SDAP) buffer; the plurality of data packets transmitted to a PDCP buffer. The at least one processor is configured to create a plurality of flow queues by dividing the PDCP buffer into at least one high priority flow queue and at least one low priority flow queue. The at least one processor is configured to determine a priority for each data packet of the plurality of data packets received based on QoS parameters. The at least one processor is configured to map at least one data packet of the plurality of data packets from the SDAP buffer to one of the at least one high priority flow queue or the at least one low priority flow queue at the PDCP buffer based on the QoS parameters. The at least one processor is configured to transmit the at least one data packet of the at least one high priority flow queue and delay transmission of at least another data packet of the at least one low priority flow queue by buffering the at least another data packet.

According to embodiments, a non-transitory computer-readable storage medium, when executed by at least one processor of an electronic device comprising a memory and at least one transceiver, stores one or more programs including instructions that cause to receive a plurality of data packets at a Service Data Adaptation Protocol (SDAP) buffer; the plurality of data packets transmitted to a PDCP buffer. The non-transitory computer-readable storage medium, when executed by the at least one processor, stores one or more programs including instructions that cause to create a plurality of flow queues by dividing the PDCP buffer into at least one high priority flow queue and at least one low priority flow queue. The non-transitory computer-readable storage medium, when executed by the at least one processor, stores one or more programs including instructions that cause to determine a priority for each data packet of the plurality of data packets received based on QoS parameters. The non-transitory computer-readable storage medium, when executed by the at least one processor, stores one or more programs including instructions that cause to map at least one data packet of the plurality of data packets from the SDAP buffer to one of the at least one high priority flow queue or the at least one low priority flow queue at the PDCP buffer based on the QoS parameters. The non-transitory computer-readable storage medium, when executed by the at least one processor, stores one or more programs including instructions that cause to transmit the at least one data packet of the at least one high priority flow queue and delay transmission of at least another data packet of the at least one low priority flow queue by buffering the at least another data packet.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This method/system is illustrated in the accompanying drawings, throughout which like reference letters indicate corresponding parts in the various figures. The example embodiments herein will be better understood from the following description with reference to the drawings, in which.

DETAILED DESCRIPTION

Figure 1:
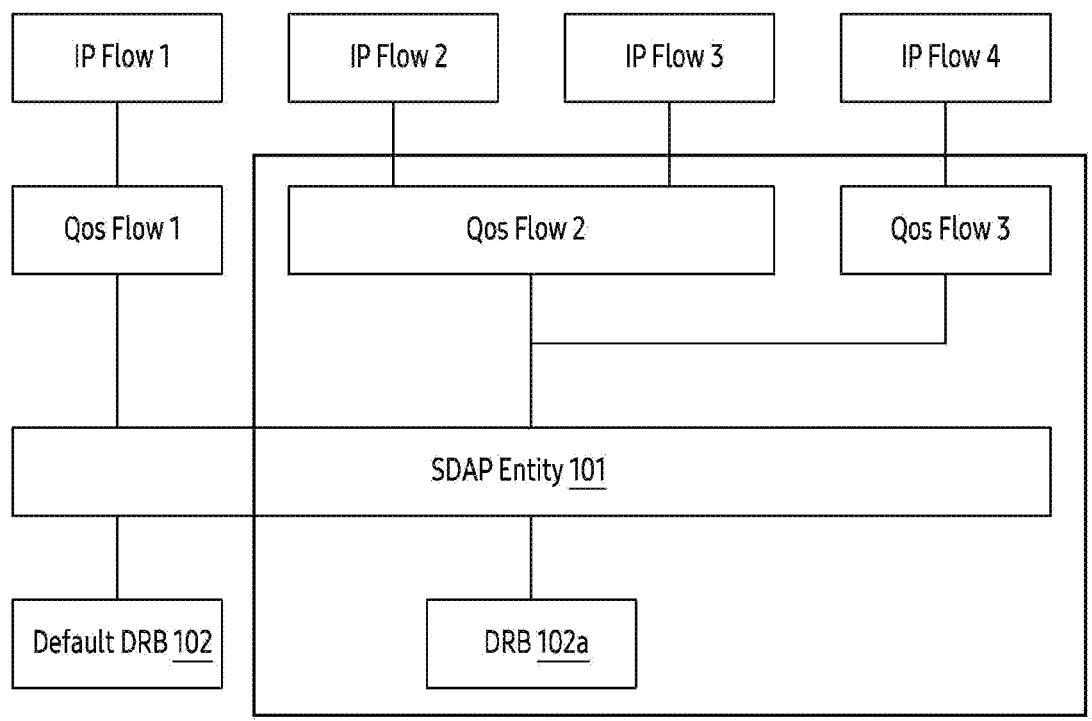
FIG. 1 is a system illustrating data packets mapped to DRBs, according to prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

An existing 5G network, multiple QoS flows can be mapped to same Data radio bearer (DRB). The QoS flow represents a stream of data traffic with defined QoS characteristics, such as throughput, latency, and packet loss requirements. The QoS flows are associated with specific applications or services. The DRB is a connection established between the electronic device and base station (eNodeB/gNB) in radio access network (RAN). The DRB provides a dedicated channel for transporting user data between the electronic device and the network. In the 5G network, one or more QoS flows can be mapped to the same DRB for efficient utilization of network resources. Different streams of data traffic with distinct QoS requirements can share the same DRB for transmission. The QoS differentiation and handling are typically managed at higher layers in the protocol stack, such as the Internet Protocol layer or the core network components like the Policy Control Function (PCF). By mapping multiple QoS flows to the same DRB, the network can optimize resource allocation, reduce signalling overhead, and efficiently manage the transmission of data traffic with varying QoS characteristics. The specific mapping and management of QoS flows to DRBs are controlled by the network elements and policies implemented within the 5G network architecture. The same shall also applicable for any beyond 5G/6G architecture.

In some existing methods the QoS flows receive the same preference irrespective of the application. The preference can be based on data packet arrival pattern or rate of data packet arrival from upper layers, which might be event triggered or user triggered. Unlike the existing methods, an example embodiment prioritizes the data packets based on a type of application or the preference and priority of the application. In existing methods, low priority data packets occupy RLC and MAC buffers if the data packets arrive frequently reducing link resources for high priority data. Additionally, in an event of thermal mitigation/high temperature of the UE, UE might mitigate temperature by throttling the availability of UL resources and so the prioritization of the data packets shall help to maintain the QoS at RAN level.

In an embodiment of the proposed method, prioritizing data packets using QoS based bearer optimization (QBO) is disclosed. The data packets/SDUs are received at a SDAP buffer. Flow queues are created by dividing a PDCP buffer into high priority flow queue and a low priority flow queue to determine a priority for each data packets based on QoS parameters which are in turn shared by upper layers based on the sense of urgency/priority of the application that triggers the data packet. The UE shall define its own priority based on decisions taken based on algorithm decided at the UE or based on user priorities. For instance, banking transactions, front end gaming, VoIP calls, streaming applications shall be treated as high priority, while background data upload, backup creation etc shall be treated with lower priority. Based on the QoS parameters performing one of transmitting the at least one data packet from the at least one high priority flow queue and delaying transmission of at least one data packet of the at least one low priority flow queue by buffering the at least one data packet, when the electronic device is configured with single connectivity or transmitting the data packets from the high priority flow queue to a first stack and the data packet from the low priority flow queue to a second stack, when the electronic device is configured with multi RAT multi connectivity.

FIG. 1 is a system illustrating data packets mapped to different DRBs (102), according to prior arts. Referring to FIG. 1, the system may include a number of Internet Protocol (IP) flows. The four IP flows (1-4) are shown in the FIG. 1, the system can include more than the one IP flow based on availability and requirements. The IP flows include a standardized method for addressing and routing the data packets, allowing the data packets to be delivered to intended destinations across networks. The destinations can be the base station (gNodeB)/RAN, a network server, or any other network element that is responsible for further processing or forwarding the data packets to the next layer in a protocol stack. The IP flow is an integral part of the overall protocol stack in PDCP (202) (e.g., see FIG. 2) and enables efficient and reliable data transfer in wireless networks such as but not limited to LTE, 5G networks and many developing wireless networks.

The data packets of the IP flow are transmitted to the QoS (Quality of Service) flow. The QoS flow refers to a virtual channel that is established to provide specific quality of service characteristics for a particular flow of data packets within the network. A flow represents a stream of packets that share common characteristics and require similar treatment or preference in terms of bandwidth, priority, latency, or other QoS parameters. Referring to FIG. 1, QoS flow 2 and QoS flow 3 are mapped to same that is DRB (102*a*). QoS flow 1 is mapped to a default DRB (102). The QoS Flows are transmitted to the SDAP entity (101). The QoS flow 2 and the QoS flow 3 are transmitted to the DRB (102*a*). The DRB (102*a*) processes the request based on pattern of packet arrival. The QoS flows are transmitted implicitly to the next layer for processing. However, a number of applications in the QoS flows require attention and needs to be processed on priority. In the existing systems, the data packets in the QoS flows are shared to the single DRB (102a) and the DRB process the data packets based on the pattern of packet arrival. Therefore, the high priority data packets are delayed in the DRB (102a). The classification of the data packets needs to be performed for processing the data packets based on the priority for a better user experience. The DRB (102a) is responsible for carrying user-specific data, such as voice calls, internet browsing, video streaming, or any other application data. The DRB provides a dedicated channel for communication between the UE and the wireless network, ensuring reliable and efficient data transmission. The Quality of Service based Bearer Optimizer (QBO) selects the data packets based on the QoS and the priority of the QoS packets.

Figure 2:
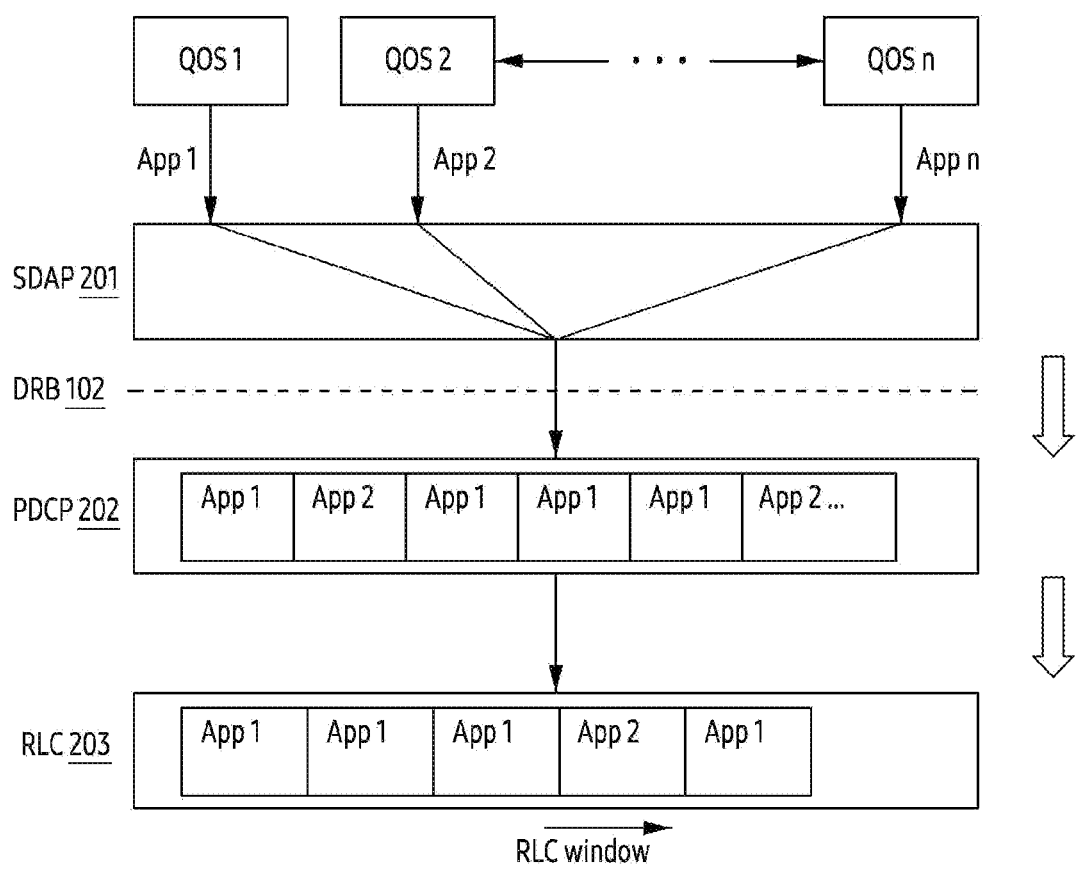
FIG. 2 is a schematic illustrating the data packets mapped SDAP, PDCP and RLC, according to prior art.

FIG. 2 is a schematic illustrating the data packets mapped to SDAP (201) (e.g., SDAP entity (101) in FIG. 1), PDCP (202) and RLC (203), according to prior arts. Referring to FIG. 2, the data packets can be QoS flow 1-QoS flow n. The QoS flows in wireless networks involve the mapping of QoS parameters from higher layers to specific QoS bearers in the SDAP (201), assigning QoS classes and performing header compression in PDCP (202), and assigning QoS parameters and ensuring reliable data transfer in RLC (203). The layers work together to provide desired QoS for different applications and services in the 5G network. The higher layers can be but not limited to application layer, transport layer, session layer, and presentation layer. The different applications can be but not limited to Banking applications, video streaming applications, Voice over IP (VoIP) applications, online gaming applications, Augmented Reality (AR) and Virtual Reality (VR) applications, Internet of Things (IoT) Applications, Cloud Services applications. The lower layers of the wireless communication network can be but not limited to physical layer, medium access control layer, radio link control layer, packet data convergence protocol layer, and service data adaptation protocol layer. The application instances are transmitted as the QoS flows and the QoS parameters can include but not limited to application Latency, data throughput, reliability, priority, and jitter.

In an embodiment, the QoS flow (1-n) are mapped to the SDAP (201). The SDAP-QoS model is used in the wireless networks for filtering the IP packets at the SDAP (201) to different configured DRBs (102). Most applications with different QoS gets mapped to the same DRB (102) but the CP treats all the packets in a same manner even though the high QoS packets can demand special priority. The SDAP (201) do not differentiate between the data packets mapped to the same DRB (102). The RLC (203) transmission window moves after receiving an acknowledgement (ACK) for the last transmitted PDU. Some applications can transmit more data packets belonging to lower QoS, and CP-AS implicitly use more resources for low QoS packets—this is not optimal, especially in poor signal conditions. For instance, a video call connection can be considered as high priority QoS flow compared to the image uploading application running in background. An inefficient sharing of spectral resources is occurred and pattern of packet arrival can cause an issue in the existing methods. The data packets with higher QoS and sharing common DRB (102) with low QoS applications can face inefficiency, low load, high priority applications can face inflated latencies due to exogenous delay. The SDAP (201) can be interchangeably used as SDAP buffer (201).

Figure 3:
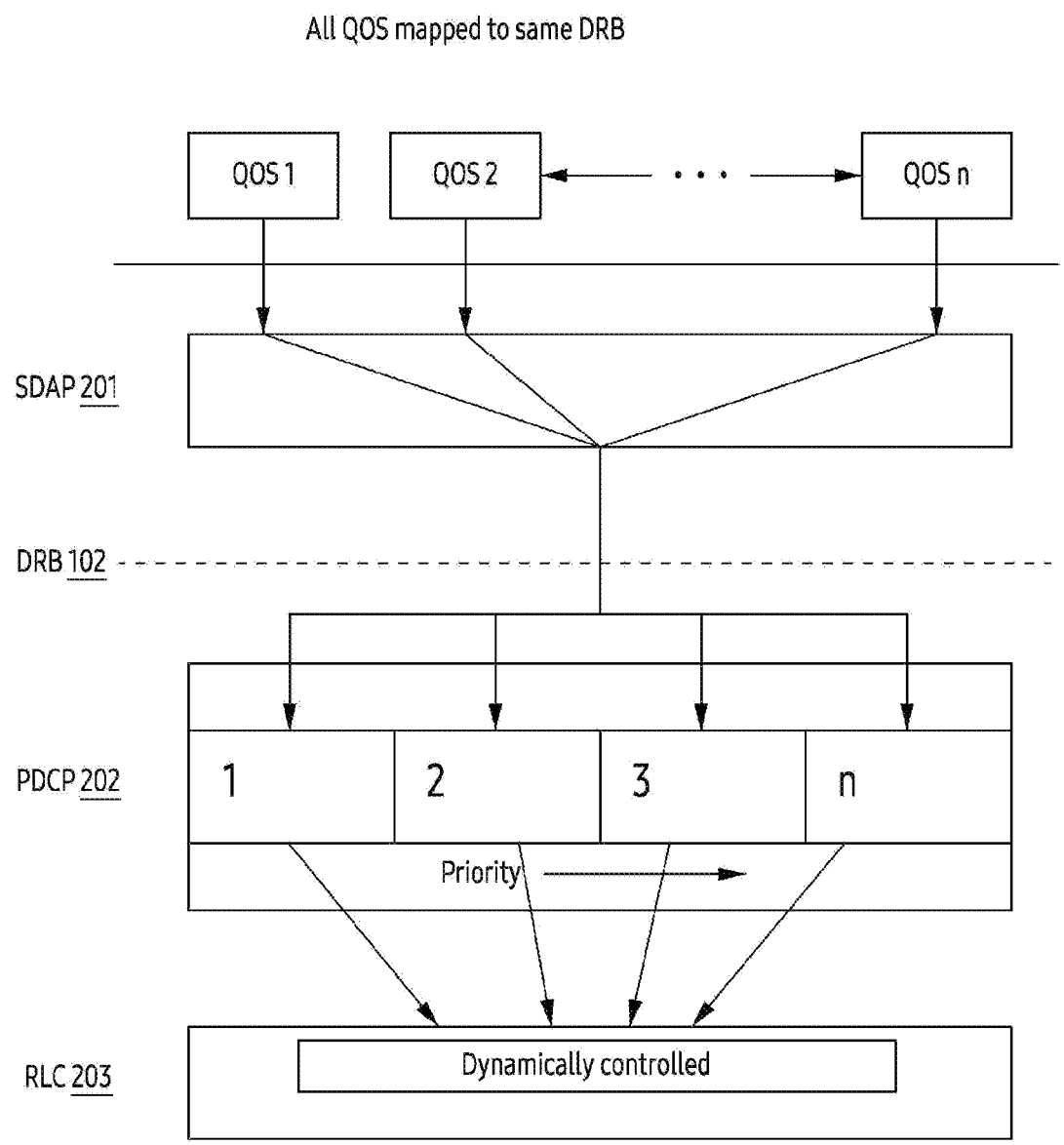
FIG. 3 is a schematic illustrating the data packets mapped to the same DRB for prioritizing the data packets, according to example embodiments.

FIG. 3 is a schematic illustrating the data packets mapped to same DRB (102) for prioritizing the data packets, according to the example embodiments. Referring to FIG. 3, the QoS are mapped to the SDAP (201) and mapped to the same DRB (102).

The SDAP (201) is a protocol in the wireless network architecture that resides in a control plane. The SDAP (201) is responsible for mapping QoS flows to specific QoS bearers in the wireless network. The SDAP (201) perform methods such as a QoS flow identification, a packet marking, and a packet header compression. The DRBs (102) transmit user data between the electronic device (900) (e.g., see FIG. 9) and the base station (gNB). The DRBs (102) are established and managed by the Radio Resource Control (RRC) protocol. The DRBs (102) are established by mapping the QoS flows from the higher layers, such as the SDAP (201) (Service Data Adaptation Protocol), to specific bearers. The mapping process ensures that different types of QoS flows receive appropriate QoS treatment. The different types of QoS flows include but not limited to conversational flows, streaming flows, interactive flows, background flows, control flows. The PDCP (202) is responsible for efficient and reliable transfer of data packets between the electronic device (900) and the gNB. The PDCP (202) performs several functions to ensure integrity, security, and efficiency of data transmission. The RLC (203) is responsible for reliable transmission of data packets between the electronic device (900) and the gNB. The RLC (203) performs functions such as Segmentation and Reassembly, Error Detection and Retransmission, In-Sequence Delivery, Flow Control, and the like.

In the proposed method, the PDCP buffer (202) is divided into flow queues. The number of flow queues of the flow queues are equal to the number of QoS mapped to the same DRB (102). The electronic device (900) can include a number of QoS flows, a number of buffers mapped to the DRB s (102). The SDAP (201) can forward the packets to the flow queue depending on the QoS of the received SDUs or QoS Flow Identifier (QFI) field of the SDAP header instead of conventional blind forwarding of the data packets. The PDCP (202) prioritize each buffer depending on the priority order. The PDCP (202) delays the transmission of lower QoS packets by buffering the data packets and high priority data packets are forwarded to the lower layers without any delay. Resources are used in events such as Thermal Mitigation (TM), poor signal conditions and the like.

TABLE 1

| 5QI Value | Re-source Type | Default Priority Level | Default Averaging Window | Example Services |
|---|---|---|---|---|
| 1 | GBR | 20 | 2000 ms | Conversational Voice |
| 2 | | 40 | 2000 ms | Conversational Video (Live Streaming) |
| 3 | | 30 | 2000 ms | Real Time Gaming, V2X messages |
| 4 | | 50 | 2000 ms | Non-Conversational Video (Buffered Streaming) |
| 65 | | 7 | 2000 ms | Mission Critical user plane Push To Talk voice (e.g. MCPTT) |
| 66 | | 20 | 2000 ms | Non-Mission-Critical user plane Push To Talk voice |
| 67 | | 15 | 2000 ms | Mission Critical Video user plane |
| 75 | | 25 | 2000 ms | V2X messages |
| 71 | | 56 | 2000 ms | "Live" Uplink Streaming |
| 72 | | 56 | 2000 ms | "Live" Uplink Streaming |
| 73 | | 56 | 2000 ms | "Live" Uplink Streaming |
| 74 | | 56 | 2000 ms | "Live" Uplink Streaming |

TABLE 1-continued

| 5QI Value | Re-source Type | Default Priority Level | Default Averaging Window | Example Services |
|---|---|---|---|---|
| 76 | | 56 | 2000 ms | "Live" Uplink Streaming |
| 5 | Non-GBR | 10 | N/A | IMS Signalling |
| 6 | | 60 | N/A | Video (Buffered Streaming) TCP-based (e.g. www, e-mail, chat, ftp, p2p file sharing, progressive video, etc.) |
| 7 | | 70 | N/A | Voice, Video (Live Streaming) Interactive Gaming |
| 8 | | 80 | N/A | Video (Buffered Streaming) TCP-based (e.g. www, e-mail, chat, ftp, p2p file sharing, progressive video, etc.) |
| 9 | | 90 | | |
| 10 | | 90 | N/A | Video (Buffered Streaming) TCP-based (e.g. www, e-mail, chat, ftp, p2p file sharing, progressive video, etc.) and any service that can be used over satellite access type with these characteristics |
| 69 | | 5 | N/A | Mission Critical delay sensitive signalling (e.g. MC-PTT signalling) |
| 70 | | 55 | N/A | Mission Critical Data (e.g. example services are the same as 5QI 6/8/9) |
| 79 | | 65 | N/A | V2X messages |
| 80 | | 68 | N/A | Low Latency eMBB applications Augmented Reality |

Figure 4:
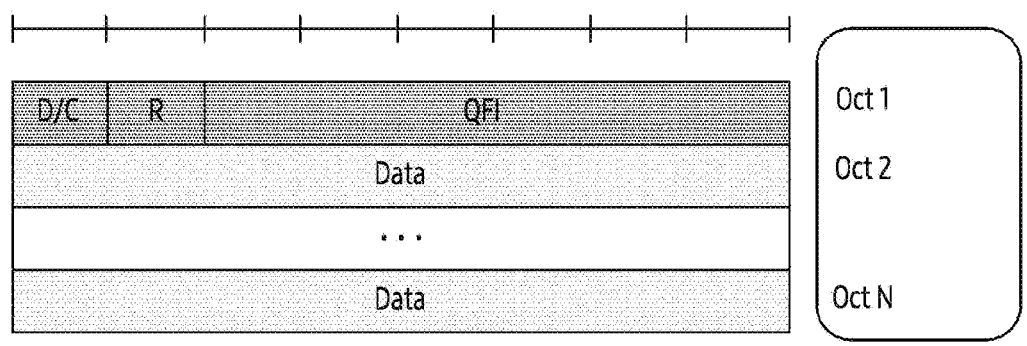
FIG. 4 is a schematic illustrating UL SDAP data PDU format with SDAP header, according to example embodiments.

FIG. 4 is a schematic illustrating UL SDAP data PDU format with SDAP header, according to the example embodiments.

D/C: The D/C (Data/Control) field indicates whether the RLC (203) PDU is an RLC data PDU (1) or RLC control PDU (0).

R: Reserved. Should be set to 0.

QFI: the QFI is typically used within the PDCP (202) and RLC (203) layers to manage QoS-related aspects of data transmission. It may not have a direct correlation to other layers in the 5G network architecture, such as the core network or the physical layer. The QFI value is used within these layers to provide differentiated treatment and appropriate handling for different QoS flows in the radio interface.

Data: the data can be for instance but not limited to real-time data, interactive data, streaming data, background data, control data. The data such as real-time data, streaming data and interactive data can be considered as high priority data packets.

Oct: "Oct" is an abbreviation for "octet," that is another term for a byte. In the UL SDAP data PDU format, the octet field represents the number of bytes contained in the PDU. Oct indicates the size of the data payload being transmitted in the PDU.

Figure 5:
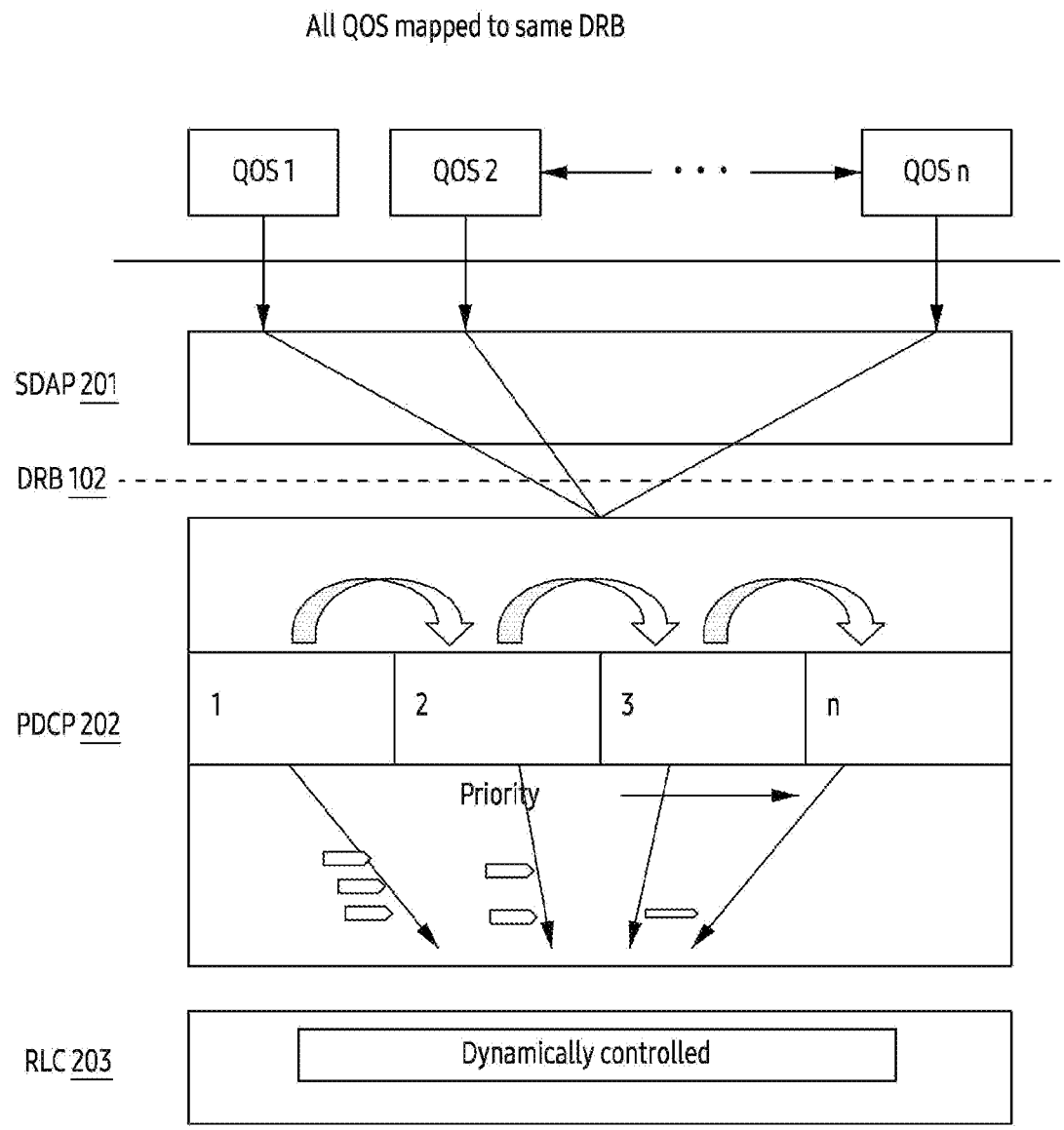
FIG. 5 is a schematic illustrating the data packets mapped to the same DRB and the data packets are transmitted to a next layer based on priority, according to example embodiments.

FIG. 5 is a schematic illustrating the data packets mapped to the same DRB (102) and the data packets are transmitted to the next layer or lower layers based on priority, according to the example embodiments. Referring to FIG. 5, the electronic device (900) may include the SDAP (201), PDCP (202), and RLC (203). The QoS flows are mapped to the SDAP (201). In an embodiment, the QoS flows are mapped to the same DRB (102). In another embodiment, the number of DRBs (102) are configured to handle the number of QoS flow in SDAP (201).

In an embodiment, a single connectivity is considered for an instance. A round-robin scheduler visits all flow queues at even frequency to extract SDAP/PDCP SDUs and forward the data packets to lower layers. In each visit, the round-robin scheduler extracts a fixed number of bytes/SDUs for a data throughput fairness. The fairness can also be functioned to extract more data from higher QoS flow depending on events like Thermal Mitigation and low uplink grant arrival from network. The single connectivity refers to a device or the wireless network is connected, directly or indirectly, to a single network or network service at a time.

As opposed to single-queue buffers, flow-queue buffers can be sized liberally without risking delay. When stored data packets have exhausted the buffer space allocated to the flow queues and a new data packet arrives, flow isolation is best enforced if the data packet is removed from a longest queue in set.

The round-robin scheduler can predict arrival pattern of UL grants in degrading channel conditions and tailors the extraction rate of SDUs accordingly from the flow queues. Whenever the SDU is removed from lower layers, the round-robin scheduler releases the SDUs from SDAP (201) or PDCP (202). Starvation of lower QoS SDUs are avoided by the round-robin scheduler.

Figure 6:
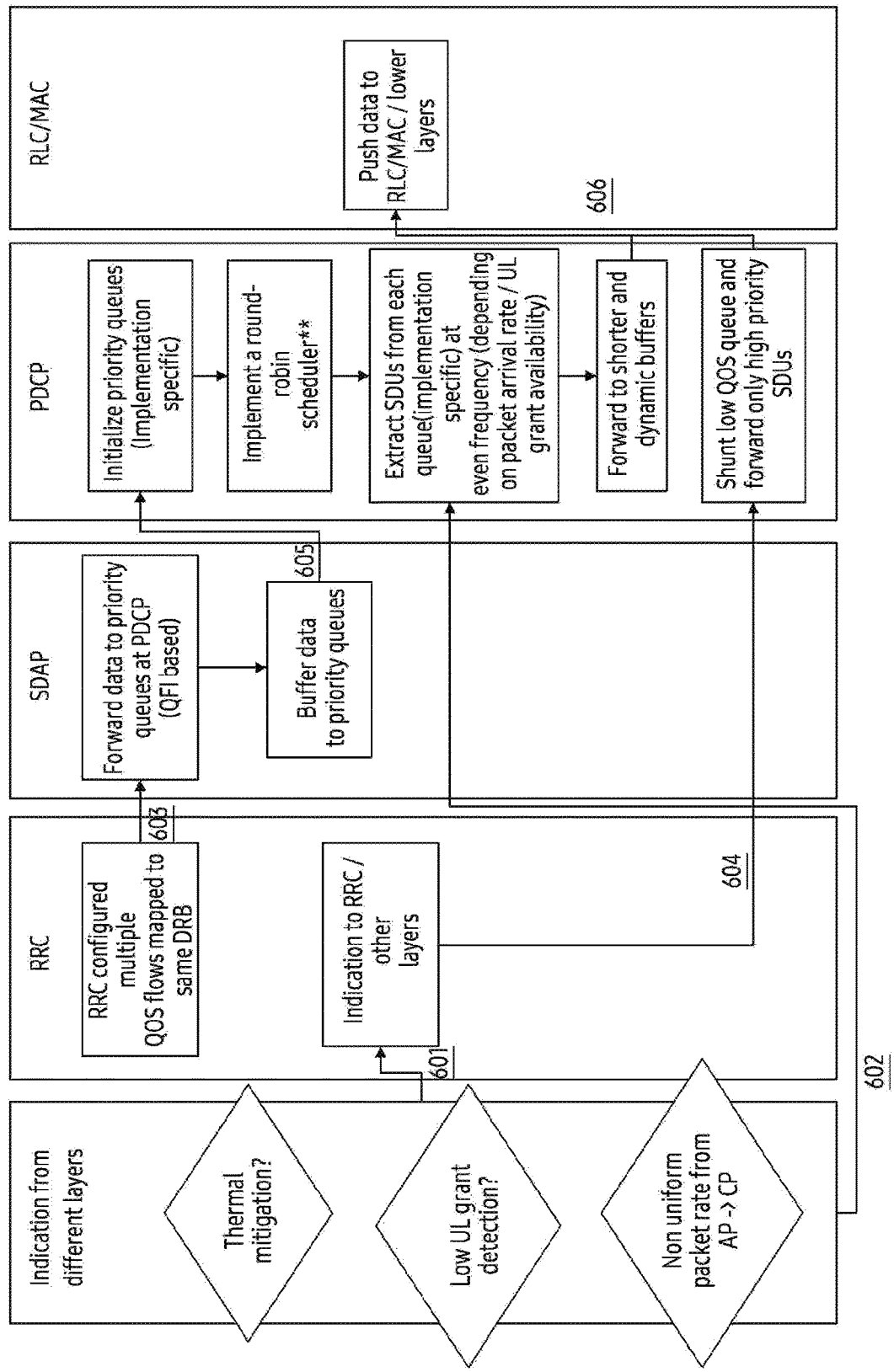
FIG. 6 is a flow diagram for prioritizing data packets using QBO based on indication from layers of the communication network, according to example embodiments.

FIG. 6 is a flow diagram for prioritizing data packets using QBO based on indication from layers of the communication network, according to the example embodiments. Referring to FIG. 6, the conditions of the different layers are collected and based on the type of condition the priority is determined. The type of conditions can be but not limited to thermal mitigation, low UL grant detection, non-uniform packet rate from AP to CP.

At 602, indications from different layers are determined. The condition can be interchangeably referred as events. The indications can be but not limited to the thermal mitigation, low UL grant detection from the network, non-uniform packet rate from applications to modem lower layers. Once the indications are received, the SDUs are extracted from each queue flow at even frequency (depending on packet arrival rate or UL grant availability). The SDUs are forwarded to shorter and dynamic buffers based on the conditions. Then at 606, the data packets are pushed to RLC (203) or MAC or lower layers.

In another embodiment, once the conditions are detected then the indication is transmitted to RRC or other layers (at 601). In the RRC layer, the RRC is configured to multiple QoS flows mapped to the same DRB (102).

At 603, once the RRC configured multiple QoS flows mapped to same DRB (102), then the data packets are forwarded at PDCP (202) (QFI based). The data packets are buffered to priority queues (at 605).

At 604, the indication to the RRC or other layers are determined, then shunt low QoS queue and forward the high priority SDUs to the RLC (203) or MAC or lower layers at 606.

At 605, once the data is buffered to priority queues then the PDCP (202) initialize the priority queues. The round-robin scheduler is implemented for the initialized priority queues. The SDUs are extracted from each queue at even frequency depending on the data packet arrival rate or UL grant availability. The shorter and dynamic buffer are forwarded to the RLC (203) or MAC layer. The data is pushed to the RLC (203) or MAC or lower layers at (606).

Figure 7:
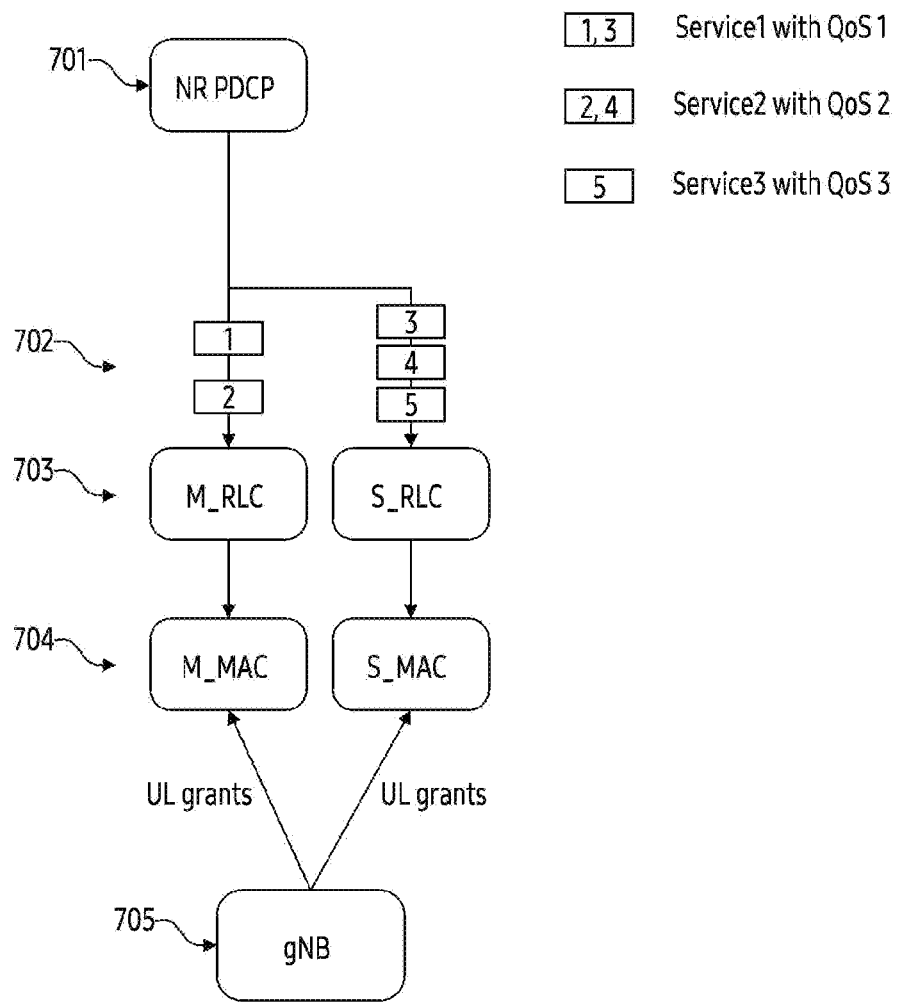
FIG. 7 is a schematic for the data packets transmitted to the next layers of the communication network based on arrival time, according to prior art.

FIG. 7 is a schematic for the data packets transmitted to the next layers of the communication network based on arrival time, according to the prior art. Referring to FIG. 7, block referring to 1, 3 includes QoS 1. Reference 2, 4 indicates service 2 with QoS 2. The reference 5 indicates service 3 with QoS 3. The services can be referred as instances of the different applications. Such as service 1 can be a first application for video calling, service 2 can be image uploading application and the like. The Multi-Radio-Dual Connectivity (MR-DC) are considered for prioritizing data packets. The data packets are split appropriately based on split ratio on both legs of the electronic device (900). The legs can be considered as but not limited to dual connectivity or multi connectivity with one leg for each connectivity of the electronic device (900). The proposed method split the packets based on the QoS or QCI of the data packets. However, in the existing methods the data packets are transmitted based on the arrival patterns.

In an embodiment, the two legs provide different QoS to the data packets based on nature of bands used, signal conditions on the two legs, other UL/DL KPIs. The SDAP (201) layer is entrusted with mapping each incoming packet to the correct DRB (102) based on the QoS flow or 5QI 5G QoS Identifier values.

If QoS based classification is implemented at CP-AS, then the classification provides better QoS to applications that demand lower latency and are critical. The dependency of higher QoS packets on lower ones, can be eliminated by employing a QoS based classification at CP side. To provide immediate attention to packets in high priority queue and forwarding to lower layers.

Referring to FIG. 7, the data packets are pushed to Master Cell Group (MCG) or Secondary Cell Group (SCG) based on the available grants and KPI of individual leg of the two legs. Though all services have different QoS, the configured QoS is not considered for pushing the data to one particular leg in New Radio-Dual Connectivity (NR-DC).

At 701, the NR PDCP transmits the QoS packets to one of the two legs as shown in FIG. 7. Different services but not limited to 1 to 5 is shown. The services include the number of QoS.

At 702, the number of services and the allocated leg is shown. The services 1 and 2 are allocated with QoS flows. The service 1 and 3 are allocated with QoS 1. The QoS 1 is with respect to instances of the one application can be considered as app1. The instances of QoS 1 is assigned to service 1 and service 3 respectively. The service 2 and 4 are assigned to QoS 2. The service 3 is assigned with QoS 3.

At 703, the M_RLC refers to the Medium Access Control (MAC) layer functionality known as the Radio Link Control (RLC (203)) protocol in wireless communication systems. The RLC (203) operates in data plane and is responsible for managing the reliable and error-free transfer of data packets between the RLC (203) entities on sender and receiver sides. The services 1 and 2 are assigned to the first leg. An S_RLC refers to the Status Report functionality of the Radio Link Control (RLC (203)) protocol in the wireless communication systems. The RLC (203) operates at the Medium Access Control (MAC) layer and is responsible for reliable and efficient data transfer between the RLC (203) entities on the sender and receiver sides. The data packets are transmitted from the service 1 and service 2 to the M_RLC and the services 3, 4 and 5 to the S_RLC.

At 704, the M_MAC and S_MAC layers receive the QoS 1, QoS 2 and QoS 3 and the like.

At 705, the gNB transmits the UL grants to the M_MAC and S_MAC.

Figure 8:
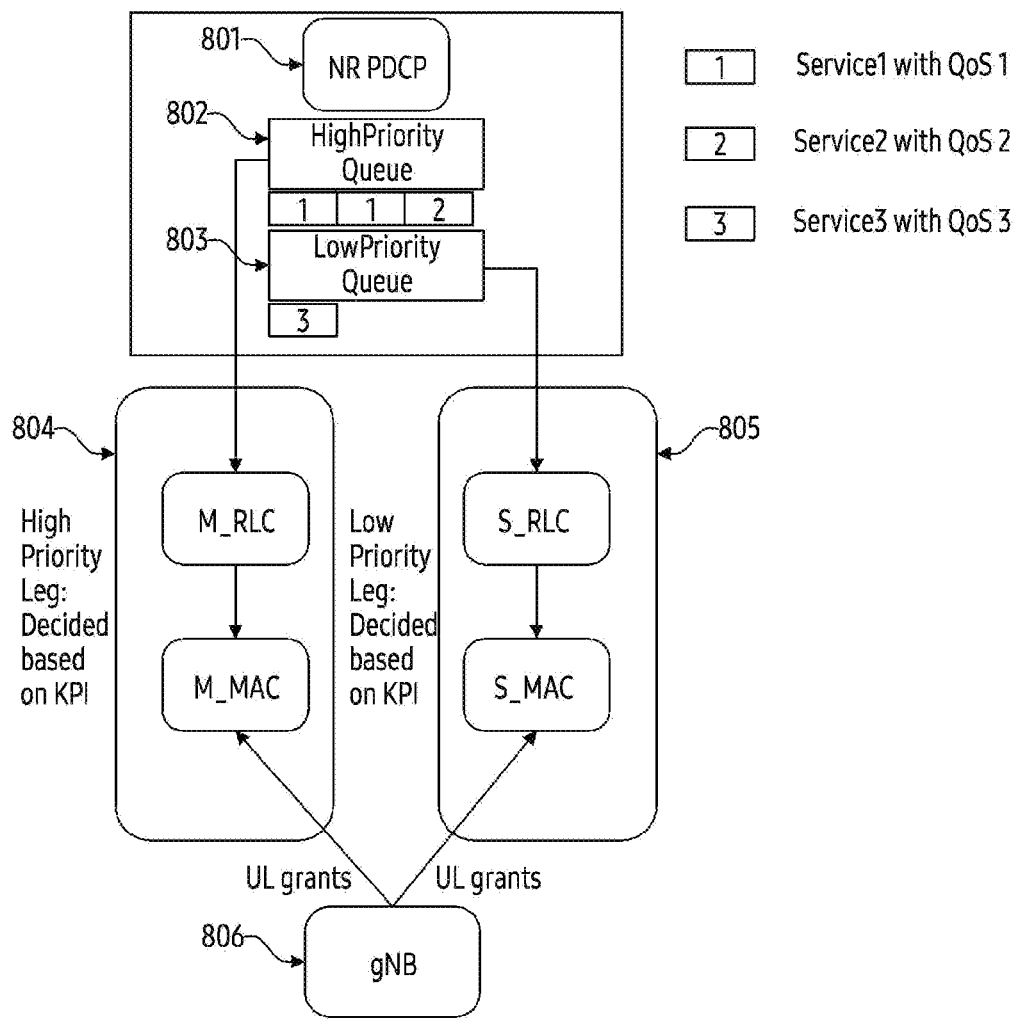
FIG. 8 is a schematic for the data packets transmitted to the next layers of the wireless network based on priority of the data packets, according to example embodiments.

FIG. 8 is the schematic for the data packets transmitted to the next layers of the wireless network based on priority of the data packets, according to the example embodiments.

The data packets are prioritized using the common QBO. The data packets are received at the SDAP (201) buffer. The flow queues are created at the PDCP buffer (202) by dividing the PDCP buffer (202) into high priority flow queue and low priority flow queue. The priority of the flow queue is determined based on the QoS parameters. The QoS parameters can be but not limited to QoS Class Identifier (QCI), type of data transmitted, number of bytes, type of data packet, number of data packets, and thermal mitigation. The data packets are mapped from the SDAP (201) buffer to the high priority flow or the low priority flow queue at the PDCP buffer (202) based on the QoS parameters. The data packets are transmitted from the high priority queue to the first stack and the low priority queue to the second stack. The data packets mapped to the low priority queue or the high priority queue at the PDCP buffer (202) based on the QoS parameters. The number of SDUs to be collected are determined in each flow queue based on the packet parameters. The packet parameters can be but not limited to are a number of SDUs or a number of bytes to be collected based on a starvation of lower QoS, a priority of the plurality of data packets at upper layers, an arrival pattern of the data packets to the first stack or the second stack, a channel condition, and an extraction rate of the number of byte. The number of SDUs are collected from the flow queue based on the priority and transmitting to lower layers of the first stack for the single mode connectivity or the second stack when a dual connectivity is configured. The data packets are mapped from the SDAP (201) to the high priority flow queue and then to the first stack and the low priority flow queue on the first stack, or to the at least one of high priority flow queue to the first stack and the at least one low priority flow queue to the second stack based on Key Performance Indicators (KPIs).

Referring to FIG. 8, at 801, the NR PDCP is disclosed. In the 5G (NR) networks, PDCP stands for Packet Data Convergence Protocol. The PDCP (202) is a protocol layer that operates in the radio interface between the LTE (Long Term Evolution) and NR (New Radio) network layers. The PDCP (202) responsible for several important methods related to data transmission and control in the network.

At 802, the high priority flow queue is shown. The high priority flow queue includes the number of services for instance but not limited to service 1, service 2 and service 3. The services 1 includes the QoS 1. In FIG. 8, the instance for QoS 1 is two times, but the instances of the QoS 1 can be more than 2. Further, the services 2 represents the different QoS (QoS2) for the different application.

At 803, the low priority queue is represented. The low priority queue may include for example service 3, the service can be more than 1. The service 3 is mapped to QoS 3 for processing as a low priority queue.

At 804, the first leg can be referred interchangeably as a first stack and the second leg or can be interchangeably referred as second stack. The data packets from the high priority queue are sent to the first stack and the data packets with low priority queue are sent to the second stack (At 805).

At 806, the gNB transmits the UL grants to the M_MAC and S_MAC.

Figure 9:
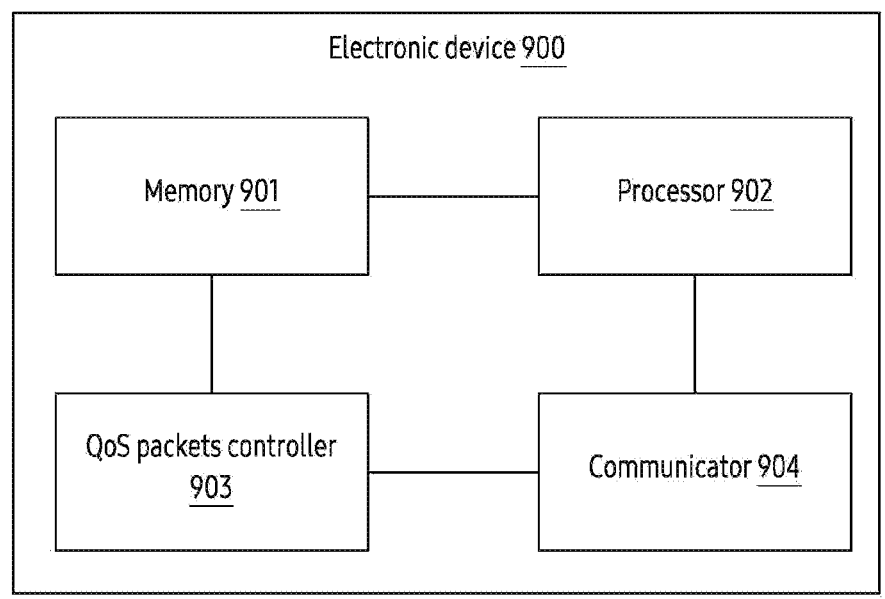
FIG. 9 is a block diagram illustrating the electronic device for prioritizing data packets using the QBO, according to the example embodiments.

FIG. 9 is a block diagram illustrating the electronic device (900) for prioritizing data packets using the QBO, according to the example embodiments. The electronic device (900) may include a memory (901), a processor (902), a QoS packets controller (903) and a communicator (904). The electronic device (900) can be but not limited to smartphones, tablets, laptop, palmtop, smart television, gaming console, smart speaker, wearable devices, E-reader, digital camera, portable media player and the like.

The memory (901) may include storage locations to be addressable through the processor (902). The memory (901) is not limited to a volatile memory and/or a non-volatile memory. Further, the memory (901) can include one or more computer-readable storage media. The memory (901) can include non-volatile storage elements. For example, non-volatile storage elements can include magnetic hard discs, optical discs, floppy discs, flash memories, or forms of electrically programmable memories (EPROM) or electrically erasable and programmable (EEPROM) memories.

The processor (902) communicates with the memory (901), the QoS packets controller (903) and the communicator (904). The processor (902) is configured to execute instructions stored in the memory (901) and to perform various processes. The processor (902) can include one or a plurality of processors, can be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (904) can be a device or application that enables communication between users or entities. The communicator (904) can encompass various forms of communication, including voice calls, video calls, messaging, and data sharing. The communicator (904) might be referred as at least one transceiver for transmitting or receiving a signal. transmits and receives signals as described above. Accordingly, the at least one transceiver may be referred to as a 'transmitter unit', a 'receiver unit', or a 'transceiver unit'. According to an embodiment, the at least one transceiver may provide an interface for communicating with other nodes in the network. In other words, the at least one transceiver may convert a bit string transmitted from the electronic device (900) to another node, such as e.g., another access node, a base station, an upper node, a core network, or the like, into a physical signal, and convert a physical signal received from another node into a bit string.

The QoS packet controller (903) determines the priority of the each data packets received at the electronic device (900). The data packets and information associated with the data packets are stored in the QoS packet controller (903). The data packets are transmitted to the lower layers based on the priorities. The QoS packet controller (903) configured to process the data packets with high priority and the data packets with low priority are buffered at the flow queue. In the MR-DC, two buffers are created for storing the high priority QoS flow and the low priority QoS flow. The high priority QoS flow is processed to the first stack respectively based on the priority. The low priority QoS flow is processed to the second stack respectively based on the priority. The processor (902) and the QoS packet controller (903) might be referred as at least one processor.

Each embodiment herein may be used in combination with any other embodiment(s) described herein.

Figure 10:
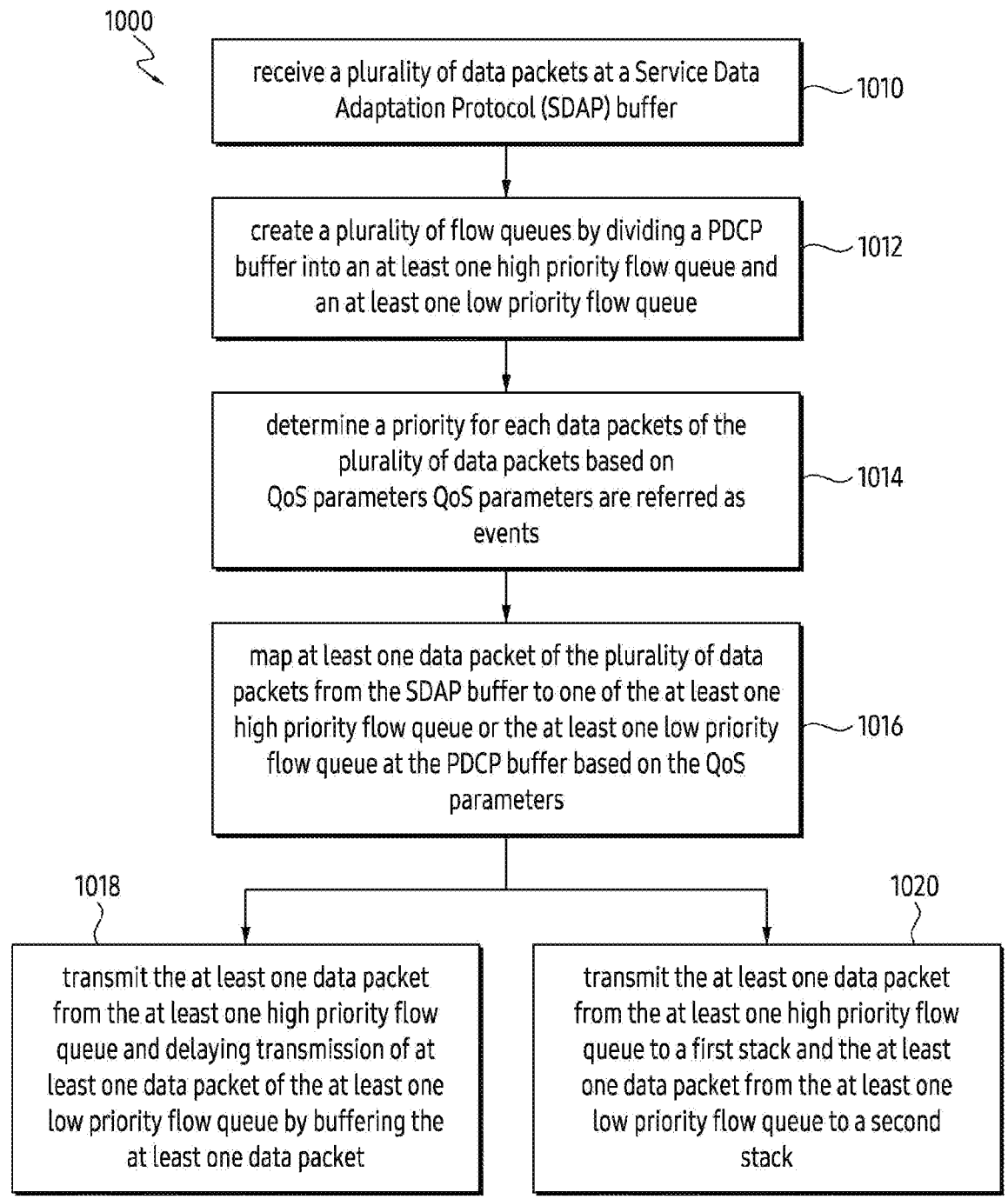
FIG. 10 is a flow diagram for prioritizing data packets using the QBO, according to example embodiments.

FIG. 10 is a flow diagram (1000) for prioritizing data packets using the QBO, according to the example embodiments.

The advantages of the proposed method are throughput fairness, low bandwidth critical applications, resource saving, thermal mitigation and poor signal conditions.

At 1010, a plurality if data packets are received at the SDAP (201) buffer.

At 1012, a flow queue is created by dividing a PDCP buffer (202) into a high priority flow queue and a low priority flow queue.

At 1014, a priority for each data packets is determined based on the QoS parameters.

At 1016, the data packets are mapped from the SDAP (201) buffer to the high priority flow queue or the low priority flow queue at the PDCP buffer (202) based on the QoS parameters. Once the data packets are mapped then step 1018 or 1020 is performed.

At 1018, the data packets are transmitted from the high priority flow queue and delaying transmission of the data packet of the low priority flow queue by buffering the data packets.

At 1020, the data packets are transmitted from the high priority flow queue to the first stack and the data packets from the low priority flow queue to the second stack.

For IP packets from applications sharing a common DRB (102), the CP perform a FIFO operation based on the rate and pattern of packet arrival in the existing methods. The priority queues and scheduler at SDAP (201) extract equal number of bytes per flow queue thus helping in throughput fairness and equal link resource usage.

For some applications with smaller BW requirement but depend on latency requirements like video calls and live video streaming, the solution can be used to ensure that the data packets don't starve because of high BW application sharing the same DRB (102). The round-robin scheduler can be implemented to prioritize higher QoS SDUs.

The buffering per bearer is divided into SDAP (201), PDCP (202) and RLC (203). In conventional AS stack, SDAP (201) and PDCP (202) blindly forward data to RLC (203) for pre-processing causing PDCP buffers (202) to remain empty (e.g., under-flow) With the proposed method, RLC (203) and PDCP buffers (202) can be made shorter and dynamic as SDAP (201)/PDCP (202) also buffers the data in queues.

In events of Thermal Mitigation, the proposed method can be implemented to shut down or reduce the low QoS flows while only prioritizing higher QoS queues in response to throttled UL grants With reduced UL grants in poor signal areas, the round-robin scheduler tailors the extraction of SDUs from each queue so that critical applications receive better treatment. The round-robin scheduler can be implemented for same purpose.

Figure 11:
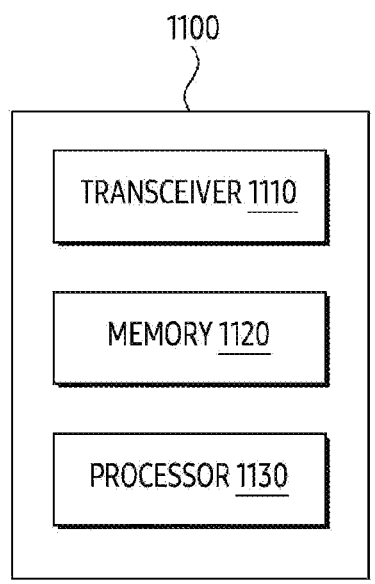
FIG. 11 is a functional configuration of an apparatus acting according to example embodiments.

FIG. 11 is a functional configuration of an apparatus acting according to embodiments. The apparatus (1100) may be a base station or a partial element of the base station. For example, the apparatus may be a central unit (CU) of the electronic device. For another example, the apparatus may be a distributed unit (DU) of the electronic device. For yet another example, the apparatus may be a CU-control plane (CU-CP) of the electronic device. For yet another example, the apparatus may be a CU-user plane (CU-UP) of the electronic device.

Referring to FIG. 11, the apparatus (1100) may include at least one transceiver (1110), at least one memory (1120), and at least one processor (1130).

The transceiver (1110) may perform functions for transmitting and receiving signals through a radio channel. For example, the transceiver (1110) may perform a converting function between a baseband signal and a bit string according to a physical layer specification of the system. For example, upon data transmission, the transceiver (1110) generates complex symbols by encoding and modulating a transmit bit string. For example, upon data reception, the transceiver (1110) restores a receive bit string by demodulating and decoding the baseband signal. Further, the transceiver (1110) may up-convert the baseband signal into a radio frequency (RF) band signal to transmit the RF band signal through an antenna, and down-convert the RF band signal received through the antenna into the baseband signal.

To this end, the transceiver (1110) may include a transmission filter, a reception filter, an amplifier, a mixer, an oscillator, a digital to analog converter (DAC), an analog to digital converter (ADC), and the like. For example, the transceiver (1110) may include a plurality of transmission/reception paths. For example, the transceiver (1110) may include at least one antenna array having a plurality of antenna elements. In terms of hardware, the transceiver (1110) may include a digital unit and an analog unit, wherein the analog unit may include a plurality of sub-units according to operating power, operating frequency, and the like.

The transceiver (1110) transmits and receives signals as described above. Accordingly, the transceiver (1110) may be referred to as a 'transmitter unit', a 'receiver unit', or a 'transceiver unit'. Further, throughout the following description, transmission and reception performed via a radio channel, a backhaul network, an optical cable, Ethernet, and other wired paths are used to include the meaning that the above-described processing is performed by the transceiver (1110). According to an embodiment, the transceiver (1110) may provide an interface for communicating with other nodes in the network. In other words, the transceiver (1110) may convert a bit string transmitted from the apparatus (1100) to another node, such as e.g., another access node, another base station, an upper node, a core network, or the like, into a physical signal, and convert a physical signal received from another node into a bit string.

The memory (1120) may store data such as e.g., a basic program, an application program, and setting information for operating the apparatus (1100). The memory (1120) may store various data used by at least one component (e.g., the transceiver (1110) or the processor (1130)). The data may include, for example, software and input data or output data for an instruction related thereto. The memory (1120) may include a volatile memory, a non-volatile memory, or a combination of the volatile memory and the non-volatile memory. Further, the memory (1120) may provide data stored therein according to a request of the processor (1130).

The processor (1130) may control the overall operations of the apparatus (1100). For example, the processor (1130) records or reads data in the memory (1120). For example, the processor (1130) transmits and receives a signal through the transceiver (1110). Although FIG. 11 illustrates one processor, embodiments of the disclosure are not limited thereto. The apparatus (1100) may include at least one processor to perform example embodiments. The processor (1130) may be referred to as a control unit or a control means, and may include a processing circuitry. According to embodiments, the processor (1130) may control the apparatus (1100) to perform at least one of operations or methods according to example embodiments.

Although only a single element (e.g., transceiver (1110), memory (1120), processor (1130)) is shown in the drawings, it is not excluded that the apparatus (1100) according to embodiments of the present disclosure may include a plurality of elements. For example, the apparatus (1100) may include a plurality of transceivers. The apparatus (1100) may include a plurality of memories. The apparatus (1100) may include a plurality of processors.

According to embodiments, a method for prioritizing data packets in a wireless communication network, the method comprises receiving, by an electronic device, a plurality of data packets at a Service Data Adaptation Protocol (SDAP) buffer, wherein the received data packets are transmitted to a PDCP buffer. The method comprises creating, by the electronic device, a plurality of flow queues at least by dividing the PDCP buffer into an at least one high priority flow queue and an at least one low priority flow queue. The method comprises determining, by the electronic device, a priority for each of the data packets of the plurality of data packets received based on QoS parameters. The method comprises mapping, by the electronic device, at least one data packet of the plurality of data packets from the SDAP buffer to at least one of the at least one high priority flow queue or the at least one low priority flow queue at the PDCP buffer based on the QoS parameters. The method comprises performing at least one of transmitting, by the electronic device, the at least one data packet from the at least one high priority flow queue and delaying transmission of at least one data packet of the at least one low priority flow queue at least by buffering the at least one data packet, when the electronic device is configured with single connectivity; or transmitting, by the electronic device, the at least one data packet from the at least one high priority flow queue to a first stack and the at least one data packet from the at least one low priority flow queue to a second stack, when the electronic device is configured with multi-RAT multi connectivity.

In an embodiment, mapping the at least one data packet of the plurality of data packets from the SDAP buffer to the at least one low priority flow queue or the at least one high priority flow queue of the plurality of flow queues at the PDCP buffer based on the QoS parameters comprises determining, by the electronic device, a number of Service Data Units (SDUs) to be collected for the plurality of data packets in each flow queue of the plurality of flow queues based on packet parameters. The mapping the at least one data packet of the plurality of data packets from the SDAP buffer to the at least one low priority flow queue or the at least one high priority flow queue of the plurality of flow queues at the PDCP buffer based on the QoS parameters comprises collecting, by the electronic device, the number of SDUs of the plurality of data packets from each flow queue of the plurality of flow queue based on the priority and transmitting to lower layers of at least one of the first stack for single mode connectivity or the second stack when a dual connectivity is configured.

In an embodiment, the packet parameters comprise at least one of: a number of SDUs and/or a number of bytes to be collected based on a depletion of lower QoS, a priority of the plurality of data packets at upper layers, an arrival pattern of the data packets to the first stack or the second stack, a channel condition, and an extraction rate of the number of byte.

In an embodiment, mapping the at least one data packet of the plurality of data packets from the SDAP buffer to the at least one of high priority flow queue and the low priority flow queue to the first stack, and/or to the at least one of high priority flow queue to the first stack and the at least one low priority flow queue to the second stack, is based on channel related Key Performance Indicators (KPIs).

In an embodiment, the QoS parameters comprise at least one of: QoS Class Identifier (QCI), 5G QoS Identifier (5Qi), type of data transmitted, number of bytes, type of data packet, number of data packets, and thermal mitigation, overheating, low uplink grant detection from gNodeB (gNB), non-uniform data packet arrival rate between application layers and modem, poor signal Key Performance Indicator (KPIs).

In an embodiment, The method comprises performing at least one of transmitting, by the electronic device, the at least one data packet from the at least one high priority flow queue and delaying transmission of at least one data packet of the at least one low priority flow queue at least by buffering the at least one data packet, when the electronic device is configured with single connectivity; and transmitting, by the electronic device, the at least one data packet from the at least one high priority flow queue to a first stack and the at least one data packet from the at least one low priority flow queue to a second stack, when the electronic device is configured with multi-RAT multi connectivity.

According to embodiments, an electronic device for prioritizing data packets in a wireless communication network, the electronic device comprises a memory. The electronic device comprises a processor. The electronic device comprises a QoS packets controller comprising processing circuitry. The electronic device comprises a communicator, comprising processing circuitry, communicatively coupled to the memory, the processor, and the QoS packet controller. The electronic device is configured to receive a plurality of data packets at a Service Data Adaptation Protocol (SDAP) buffer. The electronic device comprises create a plurality of flow queues at least by dividing a PDCP buffer into an at least one high priority flow queue and an at least one low priority flow queue. The electronic device comprises determine a priority for each data packet of the plurality of data packets received based on QoS parameters. The electronic device comprises map at least one data packet of the plurality of data packets from the SDAP buffer to at least one of the at least one high priority flow queue or the at least one low priority flow queue at the PDCP buffer based on the QoS parameters. The electronic device comprises perform at least one of transmit the at least one data packet from the at least one high priority flow queue and delay transmission of at least one data packet of the at least one low priority flow queue at least by buffering the at least one data packet, when the electronic device is configured with single connectivity; or transmit the at least one data packet from the at least one high priority flow queue to a first stack and the at least one data packet from the at least one low priority flow queue to a second stack, when the electronic device is configured with multi RAT multi connectivity.

In an embodiment, the electronic device is configured to map the at least one data packet of the plurality of data packets from the SDAP buffer to the at least one low priority flow queue or the at least one high priority flow queue of the plurality of flow queues at the PDCP buffer based on the QoS parameters comprises determining a number of Service Data Units (SDUs) to be collected for the plurality of data packets in each flow queue of the plurality of flow queues based on packet parameters. The electronic device is configured to map the at least one data packet of the plurality of data packets from the SDAP buffer to the at least one low priority flow queue or the at least one high priority flow queue of the plurality of flow queues at the PDCP buffer based on the QoS parameters comprises collecting the number of SDUs of the plurality of data packets from each flow queue of the plurality of flow queue based on priority and transmitting to lower layers of at least one of the first stack for single mode connectivity or the second stack when a dual connectivity is configured.

In an embodiment, the packet parameters comprise at least one of: a number of SDUs and/or a number of bytes to be collected based on a depletion of lower QoS, a priority of the plurality of data packets at upper layers, an arrival pattern of the data packets to the first stack or the second stack, a channel condition, and an extraction rate of the number of byte.

In an embodiment, mapping the at least one data packet of the plurality of data packets from the SDAP buffer to the at least one of high priority flow queue and the low priority flow queue to the first stack, or to the at least one of high priority flow queue to the first stack and the at least one low priority flow queue to the second stack, is based on Key Performance Indicators (KPIs).

In an embodiment, the QoS parameters comprise at least one of: QoS Class Identifier (QCI), 5G QoS Identifier (5Qi), type of data transmitted, number of bytes, type of data packet, number of data packets, and thermal mitigation.

According to embodiments, a method performed by an electronic device for prioritizing data packets in a wireless communication network, the method comprises receiving a plurality of data packets at a Service Data Adaptation Protocol (SDAP) buffer, the plurality of data packets transmitted to a PDCP buffer. The method comprises creating a plurality of flow queues by dividing the PDCP buffer into at least one high priority flow queue and at least one low priority flow queue. The method comprises determining a priority for each of the plurality of data packets received based on QoS parameters. The method comprises mapping at least one data packet of the plurality of data packets from the SDAP buffer to one of the at least one high priority flow queue or the at least one low priority flow queue at the PDCP buffer based on the QoS parameters. The method comprises transmitting the at least one data packet of the at least one high priority flow queue and delaying transmission of at least another data packet of the at least one low priority flow queue by buffering the at least another data packet.

In an embodiment, the method further comprises transmitting the at least one data packet of the at least one high priority flow queue to a first stack and the at least another data packet of the at least one low priority flow queue to a second stack, in case that the electronic device is configured with dual connectivity. The transmitting the at least one data packet of the at least one high priority flow queue and delaying transmission of the at least another data packet of the at least one low priority flow queue by buffering the at least another data packet is performed in case that the electronic device is configured with single connectivity.

In an embodiment, the mapping the at least one data packet of the plurality of data packets from the SDAP buffer to the at least one low priority flow queue or the at least one high priority flow queue of the plurality of flow queues at the PDCP buffer based on the QoS parameters comprises determining a number of Service Data Units (SDUs) to be collected for the plurality of data packets in each flow queue of the plurality of flow queues based on packet parameters. The mapping the at least one data packet of the plurality of data packets from the SDAP buffer to the at least one low priority flow queue or the at least one high priority flow queue of the plurality of flow queues at the PDCP buffer based on the QoS parameters comprises collecting the number of SDUs of the plurality of data packets from each flow queue of the plurality of flow queue based on the priority and transmitting to lower layers of at least one of the first stack for single connectivity or the second stack in case that dual connectivity is configured.

In an embodiment, the packet parameters include at least one of: a number of SDUs, a number of bytes to be collected based on a depletion of lower QoS, a priority of the plurality of data packets at upper layers, an arrival pattern of the plurality of data packets to the first stack or the second stack, a channel condition, or an extraction rate of the number of byte.

In an embodiment, the mapping the at least one data packet of the plurality of data packets from the SDAP buffer to the at least one high priority flow queue and the at least one low priority flow queue to the first stack is based on channel related Key Performance Indicators (KPIs).

In an embodiment, the mapping the at least one data packet of the plurality of data packets from the SDAP buffer to the at least one high priority flow queue to the first stack and the at least one low priority flow queue to the second stack is based on channel related Key Performance Indicators (KPIs).

In an embodiment, the QoS parameters include at least one of: QoS Class Identifier (QCI), 5G QoS Identifier (5Qi), type of data transmitted, number of bytes, type of data packet, number of data packets, thermal mitigation, overheating, low uplink grant detection from gNodeB (gNB), non-uniform data packet arrival rate between application layers and modem, or poor signal Key Performance Indicator (KPIs).

According to embodiments, an electronic device for prioritizing data packets in a wireless communication network, the electronic device comprises a memory. The electronic device comprises at least one processor. The electronic device comprises at least one transceiver. The at least one processor is configured to receive a plurality of data packets at a Service Data Adaptation Protocol (SDAP) buffer; the plurality of data packets transmitted to a PDCP buffer. The at least one processor is configured to create a plurality of flow queues by dividing the PDCP buffer into at least one high priority flow queue and at least one low priority flow queue. The at least one processor is configured to determine a priority for each data packet of the plurality of data packets received based on QoS parameters. The at least one processor is configured to map at least one data packet of the plurality of data packets from the SDAP buffer to one of the at least one high priority flow queue or the at least one low priority flow queue at the PDCP buffer based on the QoS parameters. The at least one processor is configured to transmit the at least one data packet of the at least one high priority flow queue and delay transmission of at least another data packet of the at least one low priority flow queue by buffering the at least another data packet.

In an embodiment, the at least one processor is configured to transmit the at least one data packet of the at least one high priority flow queue and delaying transmission of the at least another data packet of the at least one low priority flow queue by buffering the at least another data packet is performed in case that the electronic device is configured with single connectivity. The at least one processor is configured to transmit the at least one data packet of the at least one high priority flow queue to a first stack and the at least another data packet from the at least one low priority flow queue to a second stack, in case that the electronic device is configured with dual connectivity.

In an embodiment, the at least one processor is configured to determine a number of Service Data Units (SDUs) to be collected for the plurality of data packets in each flow queue of the plurality of flow queues based on packet parameters. The at least one processor is configured to collect the number of SDUs of the plurality of data packets from each flow queue of the plurality of flow queue based on priority and transmit to lower layers of at least one of the first stack for single connectivity or the second stack in case that dual connectivity is configured.

In an embodiment, the packet parameters include at least one of: a number of SDUs, a number of bytes to be collected based on a depletion of lower QoS, a priority of the plurality of data packets at upper layers, an arrival pattern of the plurality of data packets to the first stack or the second stack, a channel condition, or an extraction rate of the number of byte.

In an embodiment, the mapping the at least one data packet of the plurality of data packets from the SDAP buffer to the at least one high priority flow queue and the at least one low priority flow queue to the first stack is based on channel related Key Performance Indicators (KPIs).

In an embodiment, the mapping the at least one data packet of the plurality of data packets from the SDAP buffer to the at least one high priority flow queue to the first stack and the at least one low priority flow queue to the second stack is based on channel related Key Performance Indicators (KPIs).

In an embodiment, the QoS parameters include at least one of: QoS Class Identifier (QCI), 5G QoS Identifier (5Qi), type of data transmitted, number of bytes, type of data packet, number of data packets, thermal mitigation, overheating, low uplink grant detection from gNodeB (gNB), non-uniform data packet arrival rate between application layers and modem, or poor signal Key Performance Indicator (KPIs).

According to embodiments, a non-transitory computer-readable storage medium, when executed by at least one processor of an electronic device comprising a memory and at least one transceiver, stores one or more programs including instructions that cause to receive a plurality of data packets at a Service Data Adaptation Protocol (SDAP) buffer; the plurality of data packets transmitted to a PDCP buffer. The non-transitory computer-readable storage medium, when executed by the at least one processor, stores one or more programs including instructions that cause to create a plurality of flow queues by dividing the PDCP buffer into at least one high priority flow queue and at least one low priority flow queue. The non-transitory computer-readable storage medium, when executed by the at least one processor, stores one or more programs including instructions that cause to determine a priority for each data packet of the plurality of data packets received based on QoS parameters. The non-transitory computer-readable storage medium, when executed by the at least one processor, stores one or more programs including instructions that cause to map at least one data packet of the plurality of data packets from the SDAP buffer to one of the at least one high priority flow queue or the at least one low priority flow queue at the PDCP buffer based on the QoS parameters. The non-transitory computer-readable storage medium, when executed by the at least one processor, stores one or more programs including instructions that cause to transmit the at least one data packet of the at least one high priority flow queue and delay transmission of at least another data packet of the at least one low priority flow queue by buffering the at least another data packet.

In an embodiment, the non-transitory computer-readable storage medium, when executed by the at least one processor, stores one or more programs including instructions that cause to transmit the at least one data packet of the at least one high priority flow queue and delaying transmission of the at least another data packet of the at least one low priority flow queue by buffering the at least another data packet is performed in case that the electronic device is configured with single connectivity. The non-transitory computer-readable storage medium, when executed by the at least one processor, stores one or more programs including instructions that cause to transmit the at least one data packet of the at least one high priority flow queue to a first stack and the at least another data packet of the at least one low priority flow queue to a second stack, in case that the electronic device is configured with dual connectivity.

In an embodiment, the non-transitory computer-readable storage medium, when executed by the at least one processor, stores one or more programs including instructions that cause to determine a number of Service Data Units (SDUs) to be collected for the plurality of data packets in each flow queue of the plurality of flow queues based on packet parameters. The non-transitory computer-readable storage medium, when executed by the at least one processor, stores one or more programs including instructions that cause to collect the number of SDUs of the plurality of data packets of each flow queue of the plurality of flow queue based on priority and transmit to lower layers of at least one of the first stack for single connectivity or the second stack in case that dual connectivity is configured.

In an embodiment, the packet parameters include at least one of: a number of SDUs and/or a number of bytes to be collected based on a depletion of lower QoS, a priority of the plurality of data packets at upper layers, an arrival pattern of the plurality of data packets to the first stack or the second stack, a channel condition, or an extraction rate of the number of byte.

In an embodiment, the mapping the at least one data packet of the plurality of data packets from the SDAP buffer to the at least one of high priority flow queue and the at least one low priority flow queue to the first stack, or mapping the at least one data packet of the plurality of data packets from the SDAP buffer to the at least one of high priority flow queue to the first stack and the at least one low priority flow queue to the second stack are based on Key Performance Indicators (KPIs).

In an embodiment, the QoS parameters include at least one of: QoS Class Identifier (QCI), 5G QoS Identifier (5Qi), type of data transmitted, number of bytes, type of data packet, number of data packets, and thermal mitigation, overheating, low uplink grant detection from gNodeB (gNB), non-uniform data packet arrival rate between application layers and modem, or poor signal Key Performance Indicator (KPIs).

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by an electronic device for prioritizing data packets in a wireless communication network, the method comprising:
   receiving a plurality of data packets at a Service Data Adaptation Protocol (SDAP) buffer, the plurality of data packets transmitted to a PDCP buffer;
   creating a plurality of flow queues by dividing the PDCP buffer into at least one high priority flow queue and at least one low priority flow queue;
   determining a priority for each of the plurality of data packets received based on QoS parameters;
   mapping at least one data packet of the plurality of data packets from the SDAP buffer to one of the at least one high priority flow queue or the at least one low priority flow queue at the PDCP buffer based on the QoS parameters; and
   transmitting the at least one data packet of the at least one high priority flow queue and delaying transmission of at least another data packet of the at least one low priority flow queue by buffering the at least another data packet.

2. The method of claim 1, the method further comprising:
   transmitting the at least one data packet of the at least one high priority flow queue to a first stack and the at least another data packet of the at least one low priority flow queue to a second stack, in case that the electronic device is configured with dual connectivity, and
   wherein transmitting the at least one data packet of the at least one high priority flow queue and delaying transmission of the at least another data packet of the at least one low priority flow queue by buffering the at least another data packet is performed in case that the electronic device is configured with single connectivity.

3. The method of claim 1, wherein the mapping the at least one data packet of the plurality of data packets from the SDAP buffer to the at least one low priority flow queue or the at least one high priority flow queue of the plurality of flow queues at the PDCP buffer based on the QoS parameters comprises:
   determining a number of Service Data Units (SDUs) to be collected for the plurality of data packets in each flow queue of the plurality of flow queues based on packet parameters; and
   collecting the number of SDUs of the plurality of data packets of each flow queue of the plurality of flow queue based on the priority and transmitting to lower layers of at least one of the first stack for single connectivity or the second stack in case that dual connectivity is configured.

4. The method of claim 3, wherein the packet parameters include at least one of: a number of SDUs, a number of bytes to be collected based on a depletion of lower QoS, a priority of the plurality of data packets at upper layers, an arrival pattern of the plurality of data packets to the first stack or the second stack, a channel condition, or an extraction rate of the number of byte.

5. The method of claim 1, wherein the mapping the at least one data packet of the plurality of data packets from the SDAP buffer to the at least one high priority flow queue and the at least one low priority flow queue to the first stack is based on channel related Key Performance Indicators (KPIs).

6. The method of claim 2, wherein the mapping the at least one data packet of the plurality of data packets from the SDAP buffer to the at least one high priority flow queue to the first stack and the at least one low priority flow queue to the second stack is based on channel related Key Performance Indicators (KPIs).

7. The method of claim 1, wherein the QoS parameters include at least one of: QoS Class Identifier (QCI), 5G QoS Identifier (5Qi), type of data transmitted, number of bytes, type of data packet, number of data packets, thermal mitigation, overheating, low uplink grant detection from gNodeB (gNB), non-uniform data packet arrival rate between application layers and modem, or poor signal Key Performance Indicator (KPIs).

8. An electronic device for prioritizing data packets in a wireless communication network, the electronic device comprising:
   a memory;
   at least one processor;
   at least one transceiver;

wherein the at least one processor is configured to:
receive a plurality of data packets at a Service Data Adaptation Protocol (SDAP) buffer; the plurality of data packets transmitted to a PDCP buffer;
create a plurality of flow queues by dividing the PDCP buffer into at least one high priority flow queue and at least one low priority flow queue;
determine a priority for each data packet of the plurality of data packets received based on QoS parameters;
map at least one data packet of the plurality of data packets from the SDAP buffer to one of the at least one high priority flow queue or the at least one low priority flow queue at the PDCP buffer based on the QoS parameters; and
transmit the at least one data packet of the at least one high priority flow queue and delay transmission of at least another data packet of the at least one low priority flow queue by buffering the at least another data packet.

9. The electronic device of claim 8, wherein the at least one processor is configured to:
transmit the at least one data packet of the at least one high priority flow queue and delaying transmission of the at least another data packet of the at least one low priority flow queue by buffering the at least another data packet is performed in case that the electronic device is configured with single connectivity, and
transmit the at least one data packet of the at least one high priority flow queue to a first stack and the at least another data packet of the at least one low priority flow queue to a second stack, in case that the electronic device is configured with dual connectivity.

10. The electronic device of claim 8, wherein the at least one processor is configured to:
determine a number of Service Data Units (SDUs) to be collected for the plurality of data packets in each flow queue of the plurality of flow queues based on packet parameters; and
collect the number of SDUs of the plurality of data packets of each flow queue of the plurality of flow queue based on priority and transmit to lower layers of at least one of the first stack for single connectivity or the second stack in case that dual connectivity is configured.

11. The electronic device of claim 10, wherein the packet parameters include at least one of: a number of SDUs and/or a number of bytes to be collected based on a depletion of lower QoS, a priority of the plurality of data packets at upper layers, an arrival pattern of the plurality of data packets to the first stack or the second stack, a channel condition, or an extraction rate of the number of byte.

12. The electronic device of claim 8, wherein the mapping the at least one data packet of the plurality of data packets from the SDAP buffer to the at least one of high priority flow queue and the at least one low priority flow queue to the first stack is based on Key Performance Indicators (KPIs).

13. The electronic device of claim 10, wherein the mapping the at least one data packet of the plurality of data packets from the SDAP buffer to the at least one of high priority flow queue to the first stack and the at least one low priority flow queue to the second stack is based on Key Performance Indicators (KPIs).

14. The electronic device of claim 8, wherein the QoS parameters include at least one of: QoS Class Identifier (QCI), 5G QoS Identifier (5Qi), type of data transmitted, number of bytes, type of data packet, number of data packets, and thermal mitigation, overheating, low uplink grant detection from gNodeB (gNB), non-uniform data packet arrival rate between application layers and modem, or poor signal Key Performance Indicator (KPIs).

15. A non-transitory computer-readable storage medium, when executed by at least one processor of an electronic device comprising a memory and at least one transceiver, stores one or more programs including instructions that cause to:
receive a plurality of data packets at a Service Data Adaptation Protocol (SDAP) buffer; the plurality of data packets transmitted to a PDCP buffer;
create a plurality of flow queues by dividing the PDCP buffer into at least one high priority flow queue and at least one low priority flow queue;
determine a priority for each data packet of the plurality of data packets received based on QoS parameters;
map at least one data packet of the plurality of data packets from the SDAP buffer to one of the at least one high priority flow queue or the at least one low priority flow queue at the PDCP buffer based on the QoS parameters; and
transmit the at least one data packet of the at least one high priority flow queue and delay transmission of at least another data packet of the at least one low priority flow queue by buffering the at least another data packet.

16. The non-transitory computer-readable storage medium of claim 15, when executed by the at least one processor, stores one or more programs including instructions that cause to:
transmit the at least one data packet of the at least one high priority flow queue and delaying transmission of the at least another data packet of the at least one low priority flow queue by buffering the at least another data packet is performed in case that the electronic device is configured with single connectivity, and
transmit the at least one data packet of the at least one high priority flow queue to a first stack and the at least another data packet of the at least one low priority flow queue to a second stack, in case that the electronic device is configured with dual connectivity.

17. The non-transitory computer-readable storage medium of claim 15, when executed by the at least one processor, stores one or more programs including instructions that cause to:
determine a number of Service Data Units (SDUs) to be collected for the plurality of data packets in each flow queue of the plurality of flow queues based on packet parameters; and
collect the number of SDUs of the plurality of data packets of each flow queue of the plurality of flow queue based on priority and transmit to lower layers of at least one of the first stack for single connectivity or the second stack in case that dual connectivity is configured.

18. The non-transitory computer-readable storage medium of claim 15, wherein the packet parameters include at least one of: a number of SDUs and/or a number of bytes to be collected based on a depletion of lower QoS, a priority of the plurality of data packets at upper layers, an arrival pattern of the plurality of data packets to the first stack or the second stack, a channel condition, or an extraction rate of the number of byte.

19. The non-transitory computer-readable storage medium of claim 15, wherein the mapping the at least one data packet of the plurality of data packets from the SDAP buffer to the at least one of high priority flow queue and the at least one low priority flow queue to the first stack, or mapping the at least one data packet of the plurality of data packets from the SDAP buffer to the at least one of high priority flow queue to the first stack and the at least one low priority flow queue to the second stack are based on Key Performance Indicators (KPIs).

20. The non-transitory computer-readable storage medium of claim 15, wherein the QoS parameters include at least one of: QoS Class Identifier (QCI), 5G QoS Identifier (5Qi), type of data transmitted, number of bytes, type of data packet, number of data packets, and thermal mitigation, overheating, low uplink grant detection from gNodeB (gNB), non-uniform data packet arrival rate between application layers and modem, or poor signal Key Performance Indicator (KPIs).

* * * * *